United States Patent Office 3,038,733
Patented June 12, 1962

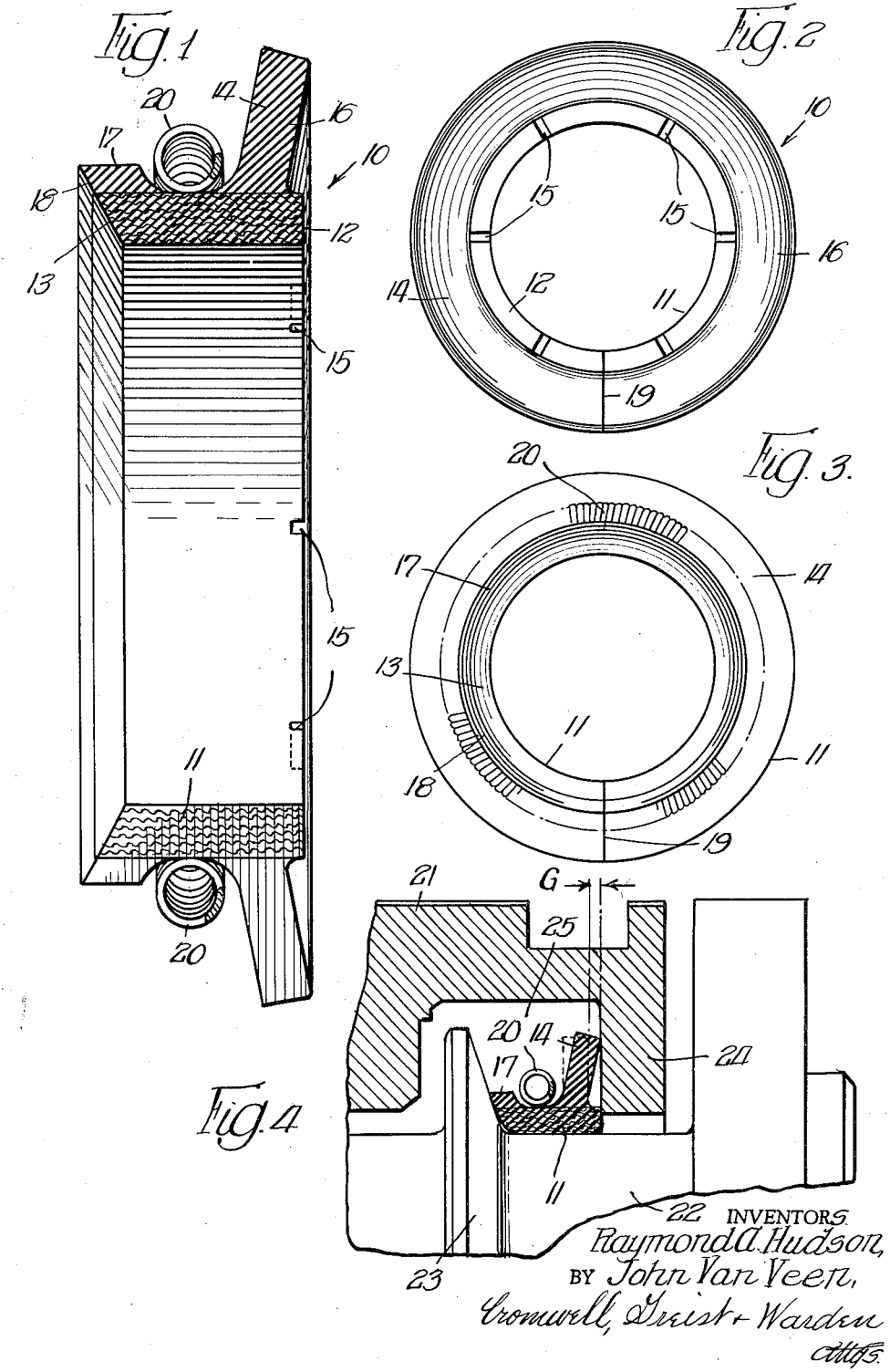

1

3,038,733
GAP SEAL
Raymond A. Hudson and John Van Veen, Detroit, Mich., assignors to Chicago Rawhide Manufacturing Company, Chicago, Ill., a corporation of Illinois
Filed Oct. 10, 1958, Ser. No. 766,623
7 Claims. (Cl. 277—157)

The present invention relates to a new and improved form of gap seal particularly adapted for application in the rear main bearing position of automotive engines. More specifically, the present invention is directed to a new and improved form of seal for mounting in a shaft assembly, the seal being designed to establish a controlled gap during operation of the assembly through which air can flow to an extent to prevent lubricant or gas flow leakage in the reverse direction.

It is an object of the present invention to provide a new and improve controlled gap seal of the type described above, the seal being of uncomplicated design and structural arrangement and being capable of establishing and maintaining a controlled gap during operative use thereof in a shaft assembly in which it is mounted, the type of gap established and maintained being particularly useful in permitting air leakage into the assembly in a direction to prevent lubricant and gas leakage therefrom.

A further object is to provide a new and improved form of end face seal including a radially directed flexible lip portion arranged to function in a shaft assembly to establish and maintain a controlled gap relative to a radial surface portion of the assembly, the gap established by the seal in the assembly being located to aid in the flow of a limited amount of air therethrough capable of preventing lubricant and gas leakage from the assembly in a reverse direction.

Another object is to provide a seal of the type described in the foregoing objects, the seal including a radially directed flexible lip portion which in response to the action of centrifugal force creates a controlled gap in the shaft assembly through which air flows for the purposes described.

Other objects not specifically set forth will become apparent from the following detailed description made in conjunction with the drawings wherein:

FIGURE 1 is a transverse vertical section of the new and improved seal of the present invention;

FIGURE 2 is a view in end elevation on a reduced scale of the seal of FIGURE 1 as viewed from the right therein;

FIGURE 3 is an opposite end elevation on reduced scale of the seal of FIGURE 1 as viewed from the left therein; and FIGURE 4 is a fragmentary, half and partial section of a shaft assembly of the type in which the seal of the present invention is particularly adapted for use.

A preferred form of gap seal 10 is illustrated in detail in FIGURES 1-3. The seal includes an annular axially extending body portion 11 provided with opposite end face sealing surfaces 12 and 13. The body portion 11 is preferably in the form of a "hard foot" made of molded rubber and fabric for proper seating engagement about a shaft and for efficient end face sealing action in a shaft assembly in a manner to be described. Although the seal 10 is illustrated as including a relatively hard and non-flexible body portion 11, it will be understood that the body portion 11 may be formed from any suitable material depending upon the operational requirements of a given seal.

The outer surface of the body portion 11 has integrally formed therewith a radially outwardly directed flexible lip portion 14 which is of substantial radial length. The lip 14, as particularly illustrated in FIGURE 1, is located in close association with the end face 12 of the body portion 11 and the base of the lip 14 is actually formed slightly inwardly of the end face 12. The lip 14 is inclined outwardly and forwardly relative to the end face 12 and is formed from readily flexible rubber or rubber-like material to permit flexing of the same during operational use of the seal 10 as will become apparent. The forward inclination of the lip 14 is such that the upper outermost edge portion thereof overhangs the end face 12 in the unmounted condition of the seal 10. This overhanging feature is clearly illustrated in FIGURE 1.

As more particularly shown in FIGURE 2, the end face 12 of the body portion 11 carries a plurality of radially directed chaplets or grooves 15 all of which extend fully across the end face 12. The grooves 15 are located forwardly of the base of the lip 14 for air flow communication with the forward radial face 16 of the lip 14.

The rear end face 13 of the body portion 11, as shown in FIGURE 1, is slanted or inclined. A relatively short flexible lip portion 17 is integrally formed with the body portion 11 in association with the rear end face 13 to provide an outer radial face 18 which constitutes a continuation of the rear end face 13. The cooperating faces 13 and 18 provide an end face sealing function with the lip portion 17 being formed from readily flexible rubber or rubber-like material to permit compressive accommodation of the rear end portion of the seal 10 in a given shaft assembly. The particular configurations of the end face 13 and lip 17 as illustrated are merely preferred, it being understood that the purpose of these portions of the seal 10 is to provide for proper rear end face sealing action in a shaft assembly.

For ease of installation and depending upon the structural features of a given shaft assembly, the seal 10 is readily adapted for splitting and is illustrated in the drawings as being split along the line designated by the numeral 19. For purposes of retaining the seal 10 in its operative position on a shaft when the same is split for ease of mounting, a continuous coil spring 20 is carried upon the body portion 11 between the lips 14 and 17. The spring 20 does not function in the seal illustrated to hold either of the lips 14 and 17 in a state of compression but merely functions to hold the split seal 10 in operative position on a shaft. However, it will be understood that slight modifications can be made to the seal 10 where it is desired to have the spring 20 additionally function in compressing the flexible lip 17 for purposes of providing a prescribed rear end face sealing action. Flexure of the lip 14 should not be impeded by the spring 20 for reasons to be explained.

FIGURE 4 illustrates installation use of the seal 10 of the present invention. The seal is particularly adapted for use in an engine rear main bearing of the type illustrated. The shaft assembly of FIGURE 4 includes a bearing housing 21 surrounding a shaft 22, such as a crankshaft, with the left hand portion of the assembly as viewed being in communicaton with a crankcase as in typical automotive drives. The seal 10 is mounted about the shaft 22 intermediate an integrally formed and radially enlarged rig 23 and a radially inwardly projecting annular wall portion 24 which forms a part of the bearing housing 21 and which defines the outermost extremity of a seal receiving area 25. The body portion 11 of the seal 10 is in opposite end face sealing engagement with the rib 23 and the innermost end portion of the wall 24. The flexible lip 17 is compressed by the rib 23 to provide therewith a tight end face seal. The forward end face 12 radially overlaps the innermost end portion of the wall 24 and the grooves 15 provide passageways through which air can move from externally of the assembly into the seal receiving area 25 and along the shaft 22 into the crankcase.

With the mounting of the seal 10 in the environment illustrated, the outermost portion of the forward radial face 16 of the lip 14 is placed in engagement with the inner radial surface of the wall 24 and the lip 14 is compressed against this wall due to the inclination of the same as previously described in connection with FIGURE 1. This arrangement provides for a tight static seal when the assembly of FIGURE 4 is not in operation and in this condition the continuous lip 14 seals off the grooves 15 relative to the interior of the assembly to prevent any static leakage along the shaft from the crankcase.

Upon operation of the shaft 22, the seal 10 rotates therewith due to its being held to the shaft by the spring 20 and centrifugal force acts on the lip 14 to flex the same toward right angled relation relative to the body portion 11 of the seal and the longitudinal axis of the shaft 22. This action is illustrated in broken lines in FIGURE 4. With flexure away from the radial surface of the wall 24, a gap G is established and maintained during continued rotation of the shaft 22. The gap G establishes communication between the exterior of the assembly and the interior thereof through the constantly open grooves 15 in the forward end face 12 of the body portion 11. Air can flow from the exterior of the assembly through the grooves 15, upwardly through the gap G into the seal receiving area 25 and along the shaft 22 into the crankcase. Upon stopping rotational operational of the shaft 22, centrifugal force is no longer active against the lip 14 and its inherent resiliency causes the same to resume its initial inclined position in sealing engagement with the adjacent radial face of the wall 24 to thus provide a complete static seal.

The gap G established during operation of the assembly of FIGURE 4 is a small controlled air gap and, by way of example, may be on the order of 0.005 of an inch. The seal 10 when rotating actually functions along the lines of an air pump and the flow of air through the gap G will counteract any tendency of oil vapor or foam to pass outwardly from the crankcase through the seal. In automotive installations the crankcase is usually under a slight vacuum during operation and where this condition exists the same constitutes an assist to the seal in pumping air into the crankcase.

The seal 10 is to a degree self-adjusting in installational use. In this respect and by way of example only, the inclination of the lip 14 is not especially critical in that if centrifugal force developed by rotation of the shaft 22 is initially insufficient to straighten the lip 14 to define the gap G, normal abrasion of the rubber face 16 against the wall portion 24 will cause wear in the lip 14 to an extent that an adequate gap will eventually be established.

While the lip 14 has been described and illustrated as being inclined relative to the body portion 11 of the seal 10, it will be appreciated that the lip 14 may be formed in vertical relation to the body portion 11 to initially establish a suitable gap G upon installation of the seal and without relying upon the action of centrifugal force. Under such circumstances, it will further be appreciated that the seal 10 in its static condition will not be self-sealing and slight leakage can occur upon graded parking of an automobile. Consequently, it is preferred that the lip 14 be inclined in the manner described.

Obviously certain modifications and variations of the invention as hereinbefore set forth may be made without departing from the spirit and scope thereof, and, therefore, only such limitations should be imposed as are indicated in the appended claims.

We claim:

1. A seal for providing controlled gap end face sealing action, said seal including an annular axially extending body portion adapted for mounting in a shaft assembly in opposite end face sealing engagement with portions thereof, opposite ends of said body portion being provided with resilient surface portions for said end face sealing engagement, and a radially directed and inclined flexible lip portion of substantial radial length integrally formed with said body portion between the end faces thereof and adapted for positioning in controlled gap relation relative to a radial surface forming a part of said assembly, said body portion being provided with means forming a part thereof and adapted to provide for air flow past said body portion and through said assembly between said lip portion and said radial surface.

2. A seal for providing controlled gap end face sealing action, said seal including an anular axially extending body portion adapted for mounting in a shaft assembly in opposite end face sealing engagement with portions thereof, opposite ends of said body portion being provided with resilient surface portions for said end face sealing engagement, and a radially outwardly directed flexible lip portion of substantial radial length integrally formed with said body portion slightly inwardly of one of the end faces thereof and adapted for positioning in controlled gap relation relative to a radial surface forming a part of said assembly, said body portion being provided with means forming a part thereof and adapted to provide for air flow past said body portion and through said assembly between said lip portion and said radial surface, said lip portion being inclined outwardly and forwardly relative to said one end face to an extent to provide for flexing thereof toward right angled relation relative to said body portion in response to centrifugal force during operative use of said seal to define and maintain said gap.

3. A seal for providing controlled gap end face sealing action, said seal including an annular axially extending body portion adapted for mounting in a shaft assembly in opposite end face sealing engagement with portions thereof, and a radially outwardly directed flexible lip portion of substantial radial length integrally formed with said body portion slightly inwardly of one of the end faces thereof and adapted for positioning in controlled gap relation relative to a radial surface forming a part of said assembly, said lip portion being inclined outwardly and forwardly relative to said one end face to an extent to provide for flexing thereof toward right angled relation relative to said body portion in response to centrifugal force during operative use of said seal to define and maintain said gap, said one end face carrying at least one radially directed groove along which air can flow through said assembly between said lip portion and said radial surface.

4. A seal for providing controlled gap end face sealing action, said seal including an annular relatively hard and non-flexible axially extending body portion adapted for mounting in a shaft assembly in opposite end face sealing engagement with portions thereof, a first radially outwardly directed flexible lip portion of substantial radial length integrally formed with said body portion slightly inwardly of one of the end faces thereof and adapted for positioning in controlled gap relation relative to a radial surface forming a part of said assembly, said first lip portion being inclined outwardly and forwardly relative to said one end face to an extent to provide for flexing thereof toward right angled relation relative to said body portion in response to centrifugal force during operative use of said seal to define and maintain said gap, said one end face carrying at least one radially directed groove along which air can flow through said assembly between said lip portion and said radial surface, and a second radially outwardly directed flexible lip portion integrally formed with said body portion with its outer radial face aligned with the other of the end faces of said body portion and adapted for compressible end face sealing action in said assembly.

5. A seal for providing controlled gap end face sealing action, said seal including an annular relatively hard and non-flexible axially extending body portion adapted for mounting in a shaft assembly in opposite end face sealing engagement with portions thereof, a first radially outwardly directed flexible lip portion of substantial radial length integrally formed with said body portion slightly inwardly of one of the end faces thereof and adapted for positioning in controlling gap relation relative to a radial surface forming a part of said assembly, said first lip portion being inclined outwardly and forwardly relative to said one end face to an extent to provide for flexing thereof toward right angled relation relative to said body portion in response to centrifugal force during operative use of said seal to define and maintain said gap, said one end face carrying at least one radially directed groove along which air can flow through said asesmbly between said lip portion and said radial surface, and a second radially outwardly directed flexible lip portion integrally formed with said body portion with its outer radial face aligned with the other of the end faces of said body portion and adapted for compressible end face sealing action in said assembly, said seal being longitudinally slit and carrying spring means about said body portion between said lip portions.

6. In a shaft assembly including a shaft received in a shaft housing which is provided with a seal receiving area partially defined by a radially inwardly projecting annular wall portion, the provision of a seal which includes a body portion mounted on said shaft, a flexible lip portion formed integral with said body portion and extending radially therefrom into said seal receiving area, said lip portion being closely adjacent one end face of said body portion, which end face radially overlaps the innermost end portion of said wall portion in end face sealing engagement therewith, said lip portion being inclined toward and in engagement with said wall portion while being located relative thereto for movement into controlled gap relation therewith in response to the action of centrifugal force upon rotation of said shaft, and means forming a part of said one end face permitting the passage of air through said assembly.

7. In a shaft assembly including a shaft received in a shaft housing which is provided with a seal receiving area partially defined by a radially inwardly projecting annular wall portion, the provision of a seal which includes a body portion mounted on said shaft, a flexible lip portion formed integral with said body portion and extending radially therefrom into said seal receiving area, said lip portion being closely adjacent one end face of said body portion, which end face radially overlaps the innermost end portion of said wall portion in end face sealing engagement therewith, said lip portion being inclined toward and in engagement with said wall portion while being located relative thereto for movement into controlled gap relation therewith in response to the action of centrifugal force upon rotation of said shaft, and means forming a part of said one end face permitting the passage of air through said assembly, said means being radially directed grooves.

References Cited in the file of this patent

UNITED STATES PATENTS

| | | |
|---|---|---|
| 2,144,691 | Schmal | Jan. 24, 1939 |
| 2,258,527 | Warman | Oct. 7, 1941 |
| 2,418,707 | Groot | Apr. 8, 1947 |
| 2,478,649 | Wightman | Aug. 9, 1949 |
| 2,480,464 | Gregoire | Aug. 30, 1949 |
| 2,561,694 | Gilbert | July 24, 1951 |
| 2,598,094 | Augereau | May 27, 1952 |
| 2,665,929 | Sawyer | Jan. 12, 1954 |